Patented Nov. 1, 1949

2,486,804

UNITED STATES PATENT OFFICE 2,486,804

COATING CELLULOSIC TEXTILES WITH MALEIC ANHYDRIDE-STYRENE COPOLYMER AND SOLID POLYETHYLENE GLYCOL

Raymond B. Seymour and George M. Schroder, Chattanooga, Tenn., assignors to Henry H. Frede and Company, Chattanooga, Tenn., a corporation of Tennessee No Drawing. Application October 8, 1947, Serial No. 778,716

4 Claims. (Cl. 117—143)

This invention relates to flexible coatings, and more particularly to compositions which may be applied to cellulosic material to produce a flexible coating which is substantially insoluble in water and organic solvents.

Still more particularly, the film or coating when applied to cellulosic materials in the form of fiber, thread, yarn, sheet, web or fabric, produces a product of increased strength, durability and abrasion resistance. The treatment is substantially permanent and remains flexible on aging.

Although a large number of compositions for sizing, coating and impregnation have been developed, they ordinarily possess one or more short-comings which make them unsatisfactory for the use intended. For example, water insoluble coatings are generally added in organic solvents which must be removed after application or as aqueous dispersions. In either case, the products are not resistant to organic solvents. Also, solvent resistant coatings have been applied in aqueous solutions but these are not resistant to water. Some attempts to overcome these difficulties have been made by the application of thermosetting resins but these give an undesirable hand to the products when used in sufficient quantity to secure a complete coating.

The present invention provides a colorless, clear, flexible coating which is substantially insoluble in water or organic solvents. It is not brittle and will not crack or peel off the material to which it is applied despite sharp flexing. Although the coating is not hard, it is tough and exceptionally strong. Moreover, material having the present coating thereon has an agreeable feel in the hand.

An especial advantage of the composition is that it may be used as an aqueous solution and this makes it convenient to market and to use. To form the coating, a film of the composition merely needs to be applied to a material and then it requires heating such as can be carried out by use of an ordinary sadiron.

One excellent use of the composition is its application to a sheet of material made up of random disposed fibers as is set forth in the applications filed by the present co-inventors to produce disposable diapers. The composition may be applied also to other clothing fabrics, as well as to awnings, tablecloths, bibs and like materials.

In general terms the invention involves the copolymerization of a styrene-maleic anhydride resin with a solid polyalkylene glycol. An important feature is the use of a solid polyalkylene glycol because it has been found that this solid material results in a product having wholly unexpected and desirable properties which are not obtainable if a liquid polyalkylene glycol is used.

It has heretofore been suggested that a liquid polyalkylene glycol may be reacted with a styrene-maleic anhydride resin to produce a hard, abrasive resistant coating suitable as a wire enamel. This prior known product is not, however, suitable for the uses to which the coating of the present invention is to be put as this prior coating makes the fabric to which it is applied too stiff and boardy. It would not be expected from the results obtained with the use of a liquid polyethylene glycol that such a highly flexible coating would be obtained by the use of a solid polyethylene glycol.

The solid polyethylene glycols which are suitable for use should have an average molecular weight which is at least as high as 1000 and may be as high as 7000. These materials are very water soluble and are highly hygroscopic.

The hetero-polymer of styrene and maleic acid or its anhydride may be obtained, for example, in accordance with the disclosure of Patent 2,047,398 to Voss et al. and it should have a molecular weight such that an 0.2% aqueous solution will have a viscosity of from 0.5 to 50 centipoises. The ammonium salt of this polymer is used in making up the aqueous solution.

It has been found that ratios of 35 to 75 parts by weight of styrene-maleic anhydride and 25 to 65 parts of solid polyethylene glycol are satisfactory since the coating produced is very flexible and has an agreeable feel. If more than 60% of the combined weights is styrene maleic anhydride the coating will be water-resistant. A more water-proof coating is obtained with increasing amounts of the styrene-maleic anhydride hetero-polymer. By progressively increasing the amount of the solid polyethylene glycol above 40% of the combined weights, the coating becomes more and more capable of transmitting moisture therethrough. This relationship is also affected by the molecular weight of the solid polyethylene glycol as higher molecular weights tend to make the coating less water-repellent.

Preferably, the solid polyethylene glycol and the styrene-maleic anhydride, in the above range of proportions, are used in an amount to make up a 1% aqueous solution. Excellent results are, however, obtained with an aqueous solution of from 0.5 to 10.0%. This aqueous solution may be applied to the fabric to be coated, in any desired manner such as by spraying it or brushing it on. Or, the composition may be applied by a roller over which the fabric passes, the composition being continuously supplied to the roller by a spray or by a bath of the solution into which the roller dips.

After the composition has been applied to the roller, it is heated to dry it and bring about the condensation of the styrene-maleic anhydride resin and the solid polyalkylene glycol. The heat must be within the temperature range of 250° to 450° F. This heat may be applied by the use of a sadiron or other like means as by passing the material over a roller heated to this temperature.

The heat not only serves to remove the water of solution, but also serves to drive off the ammonia from its salt of the styrene-maleic anhydride. As a result, a water-insoluble coating is produced and it is presumed that this is because the heat causes a reaction between the carboxyl groups of the styrene-maleic acid and the hydroxyl groups in the solid polyethylene glycols which result in the formation of a water-insoluble cross-linked material when the ammonia is driven off. Since only two hydroxyl groups are present in molecules of the polyethylene glycol having molecular weights of 1000 to 7000, it is surprising that a soft flexible film which is essentially insoluble, results.

It is preferable that the mixture of the solid polyethylene glycol and the styrene-maleic anhydride be applied in such quantity that it will be present in the final coating in the range of 0.25 to 2.0 pounds per thousand square feet. A film of this density can be readily applied, for example, by adjusting the speed of rotation of the applying roller and the quantity of the aqueous composition delivered to the roller by a spray.

The resulting coating is a continuous one if care is taken in the application of the aqueous composition. As has been stated, the coating is highly flexible, is not hard or brittle and if it is applied to wearing apparel, the garment is comfortable to wear and has a good hand. Moreover, the fabric is substantially washproof.

The invention may be illustrated further by the following examples:

*Example 1.*—One or both sides of a cotton web or sheet is sprayed with a 2% aqueous solution made up of 0.6 pound of dissolved solid polyethylene glycol having an average molecular weight of 1540, and 1.4 pounds of the ammonium salt of styrene-maleic acid in 98 pounds of water. The sprayed material is passed through drum rollers maintained at a temperature of from 325 to 450° F. The resulting coated fabric was essentially impervious to water.

*Example 2.*—To one side of a web of regenerated cellulose is padded a 2% aqueous solution made up of 0.8 pound of dissolved polyethylene glycol having an average molecular weight of 4,000 and 1.2 pounds of the ammonium salt of styrene-maleic acid heteropolymer in 98 pounds of water. The impregnated felt is passed through a drying chamber to remove water and then through drum roller at 325 to 450° F. The untreated felt had little strength, while the treated product was strong, soft and had a good hand.

*Example 3.*—Solution used in Example 1 applied to one side and solution used in Example 2 applied to the other and cured as in Example 2.

*Example 4.*—Woven cotton fabric is treated as in Example 1.

*Example 5.*—A felt made up of cellulose fibers from wood is treated as in Example 2.

*Example 6.*—Paper is treated as in Example 2.

Instead of the styrene, it is possible to use a chemically equivalent weight of vinyl naphthalene, methyl isopropenyl benzene, vinyl acetate, vinyl propionate, vinyl butyrate, vinyl chloride, and vinyl bromide.

Instead of the maleic acid or its anhydride, it is possible to use a chemically equivalent amount of methyl maleic acid, dimethyl maleic acid, phenyl maleic acid, mono-methyl maleate and mono-ethyl maleate.

What is claimed is:

1. A composition for application to cellulosic textile material to produce a substantially water insoluble coating thereon after heating to a temperature of from 250° to 450° F., which consists of an aqueous solution of a solid polyethylene glycol having an average molecular weight of from 1,000 to 7,000 and a styrene-maleic anhydride resin having a molecular weight such that a 0.2% aqueous solution will have a viscosity of from 0.5 to 50 centipoises, the latter components being present in the ratios of 25 to 65 parts by weight of solid polyethylene glycol and 35 to 75 parts of a styrene-maleic anhydride.

2. A composition for application to cellulosic textile material to produce a substantially water insoluble coating thereon after heating to a temperature of from 250° to 450° F., which consists of a 0.5 to 10.0% aqueous solution of a solid polyethylene glycol having an average molecular weight of from 1,000 to 7,000 and a styrene-maleic anhydride resin having a molecular weight such that a 0.2% aqueous solution will have a viscosity of from 0.5 to 50 centipoises, the latter components being present in the ratios of 25 to 65 parts by weight of solid polyethylene glycol and 35 to 75 parts of styrene-maleic anhydride.

3. The method of coating cellulosic textile material which comprises applying thereto a 0.5 to 10.0% aqueous solution of a solid polyethylene glycol and a styrene-maleic anhydride resin, the solid polyethylene glycol having an average molecular weight of from 1000 to 7000 and the styrene-maleic anhydride resin having a molecular weight such that a 0.2% aqueous solution will have a viscosity of from 0.5 to 50 centipoises, the latter components being present in the ratios of 25 to 65 parts by weight of solid polyethylene glycol and 35 to 75 parts by weight of styrene-maleic anhydride, and thereafter heating to from 250° to 450° F., the solution being applied to yield a dried coating in the range of from 0.25 to 2.0 pounds per thousand square feet.

4. The method of coating cellulosic textile material which comprises applying thereto a 0.5 to 10.0% aqueous solution of a solid polyethylene glycol having an average molecular weight of from 1,000 to 7,000 and a styrene-maleic anhydride resin, having a molecular weight such that a 0.2% aqueous solution will have a viscosity of from 0.5 to 50 centipoises, the latter components being present in the ratios of 25 to 65 parts by weight of solid polyethylene glycol and 35 to 75 parts by weight of styrene-maleic anhydride, and thereafter heating to from 250° to 450° F.

RAYMOND B. SEYMOUR.
GEORGE M. SCHRODER.

REFERENCES CITED

The following references are of record in the file of this patent:

UNITED STATES PATENTS

| Number | Name | Date |
| --- | --- | --- |
| 2,047,398 | Voss | July 14, 1936 |
| 2,300,074 | Strain | Oct. 27, 1942 |
| 2,324,739 | Stoops | July 20, 1943 |